Feb. 28, 1933. G. F. THOMAS ET AL 1,899,834
CLUTCH
Filed Feb. 18, 1930 4 Sheets-Sheet 1
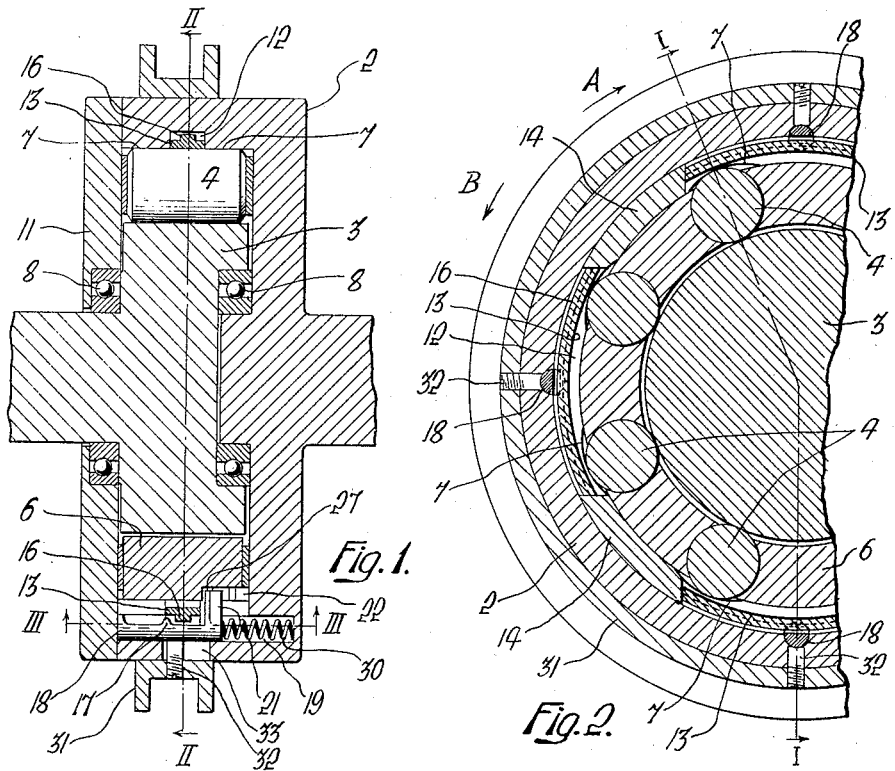
INVENTORS
G. F. THOMAS AND T. D. LEAPER
by
ATTY.

Feb. 28, 1933.  G. F. THOMAS ET AL  1,899,834
CLUTCH
Filed Feb. 18, 1930   4 Sheets-Sheet 2

INVENTORS
G.F.THOMAS AND T.D.LEAPER
by
ATTY.

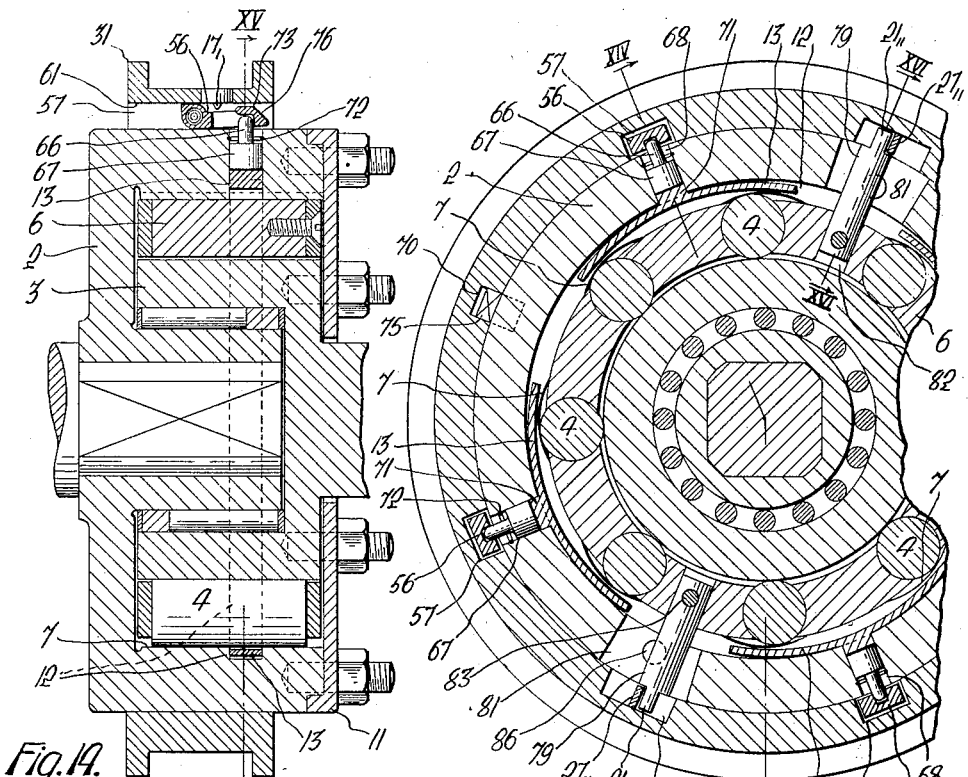
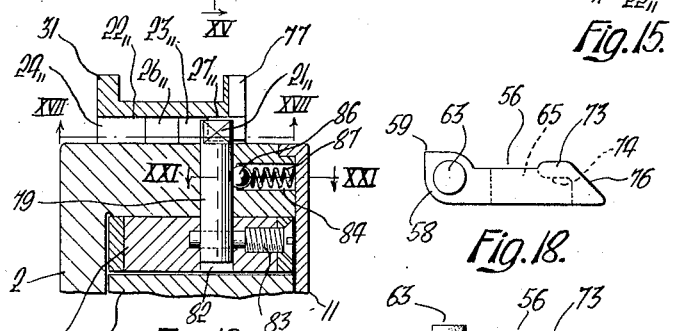
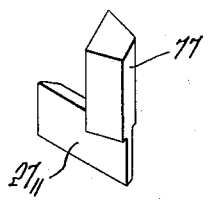
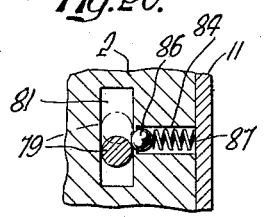
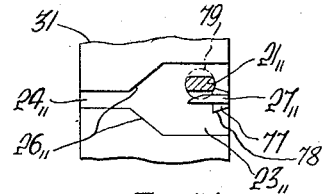

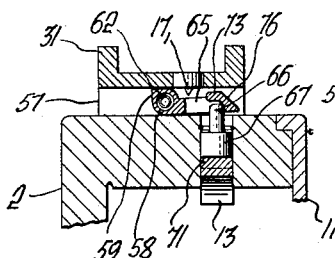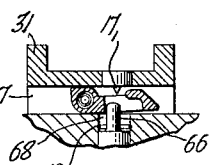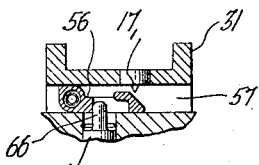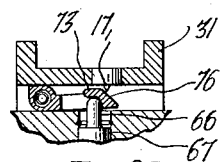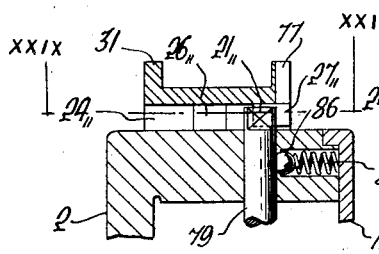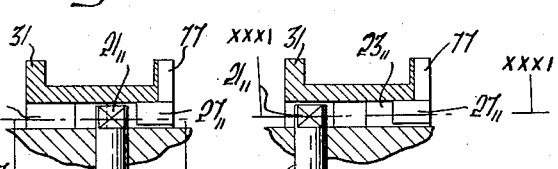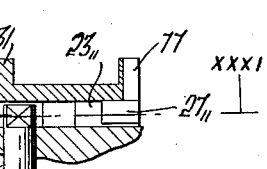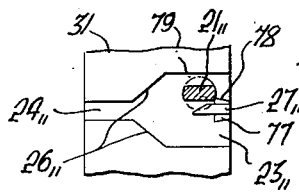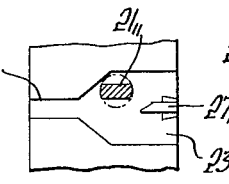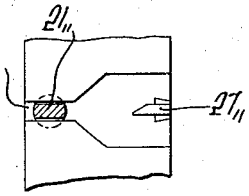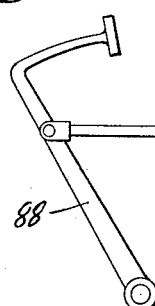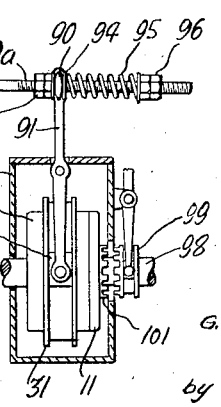

Patented Feb. 28, 1933

1,899,834

UNITED STATES PATENT OFFICE

GEORGE FREDERICK THOMAS, OF CAMBERWELL, VICTORIA, AND THOMAS DUNCAN LEAPER, OF ST. KILDA, VICTORIA, AUSTRALIA

CLUTCH

Application filed February 18, 1930, Serial No. 429,353, and in Australia April 2, 1929.

This invention relates to overrunning clutches, ratchets and such like devices embodying frictional gripping elements such as rollers, balls or the like which are adapted to co-act with the driving and driven members of the device and, under certain conditions, provide a driving connection which allows the driven member to overrun the driving member.

One of the objects of the present invention is to provide improved controlling means for the frictional gripping elements of an overrunning clutch or like device, the controlling means being readily operable to position the gripping elements for transmitting the drive from the driving to the driven member of the device. This is effected by the provision of means adapted to engage the gripping elements to cause them to roll into positions for driving.

The improved means also provide for the gripping elements being automatically caused to revert to driving positions when the speed of the driven member reverts to synchronism with the speed of the driving member after the driven member has been caused or allowed to overrun. The gripping elements can of course be set in a neutral position so that clutching will not take place in either direction.

It is to be understood that the foregoing objects may be obtained if and when the driving member becomes the driven member and vice versa.

A clutch embodying the present improvements is particularly suitable for use as a so called "free wheel" or "coasting" device for automobiles and in such adaptation is fitted between the gear box or change speed mechanism and the propeller or Cardan shaft.

But in order that this invention may be readily understood reference will now be made to the accompanying drawings wherein certain constructional forms of the invention are illustrated by way of example. In these drawings, Figure 1 is a sectional elevation of a clutch embodying improvements in accordance with this invention. The section is taken on the line I—I of Figure 2.

Figure 2 is a fragmentary cross section taken on the line II—II of Figure 1.

Figure 3 is a view showing two of the frictional gripping elements with associated parts, taken approximately on the line III—III in Figure 1.

Figure 4 is similar to Figure 3 but showing the parts in another position.

Figure 5 is similar to Figures 3 and 4, but shows the parts in yet another position.

Figure 6 is an enlarged view of some of the parts seen in Figures 1, to 5.

Figure 7 is a fragmentary cross section wherein gripping elements are shown in positions corresponding to Figure 4.

Figure 8 is a fragmentary cross section wherein gripping elements are shown in positions corresponding to Figure 5.

Figure 14 is a sectional elevation of a clutch embodying another constructional form of the present invention, the section being taken approximately on the line XIV—XIV in Figure 15.

Figure 15 is a fragmentary cross section taken approximately on the line XV—XV in Figure 14.

Figure 16 is a fragmentary section taken approximately on the line XVI—XVI in Figure 15.

Figure 17 is an inverted plan view taken approximately on the line XVII—XVII in Figure 16.

Figure 18 is a detail in side elevation of a member of the control means seen in Figure 14.

Figure 19 is a part sectional plan of the member seen in Figure 18.

Figure 20 is an enlarged perspective of a member of the control means seen in Figures 16 and 17.

Figure 21 is a fragmentary section taken approximately on the line XXI—XXI in Figure 16.

Figures 22 to 25 are like fragmentary sectional views showing certain members of the controlling means in different positions.

Figures 26, 27 and 28 are fragmentary views showing other members of the controlling means in corresponding different positions.

Figures 29, 30 and 31 are plan views taken approximately on lines XXIX, XXX, XXXI of Figures 26, 27 and 28 respectively.

Figure 32 shows convenient operative connections extending between a clutch device as illustrated in Figures 14 to 31 and a pedal of a conventional clutch as provided on an automoible between the engine and the change speed mechanism.

Figure 9:
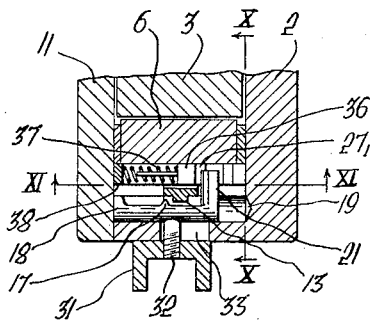
Figure 9 is a fragmentary section of a clutch showing a modified form of controlling means.

In the drawings the numerals 2 and 3 denote respectively outer and inner members of a free wheel or overrunning clutch. Either of these members may act as the driven member, but for the purpose of this description it will be assumed that the outer member 2 is the driver. Frictional gripping elements 4, shown in the form of rollers, are suitably retained in circumferentially spaced relationship in a cage 6 and adapted to engage cam surfaces 7 formed in the inner periphery of the driving member 2. Bearings 8 which may if desired be of the thrust type, may be provided to maintain the members 2 and 3 in proper axial alignment. One of the bearings 8 may be retained in position by a cover plate 11 suitably attached to the driving member 2.

Extending around the inner periphery of the driving member 2 and preferably about midway of its width is a groove 12 accommodating a number of presser members 13 which may be retained in circumferentially spaced relationship by spacers 14 (Figure 2). The presser members are shown in the form of steel or metal strips curved complementary to the inner periphery of the driving member, each presser being adapted to contact with say a pair of the gripping elements 4.

Each presser may have a circumferential rib 16 projecting from its outer or convex surface for strengthening purposes and also to provide an abutment adapted to be engaged by a striker 17 on a slide 18 to thereby force the respective presser into contact with its associated gripping elements. The slides 18 may be housed in bores or keyhole slots 19 in the outer part of the driving member 2, and each slide may be provided at its forward end with an inwardly projecting lug 21 adapted to engage a slot or recess 22 in the outer surface of the cage 6. As more clearly seeen in Figure 6 each slot 22 may have an inner portion 23 which is relatively wide and an outer portion 24 wihch is relatively narrow, the portions 23, 24 being connected by a tapering portion with inclined edges 26. Centrally of the width of portion 23 and projecting therein is a detent 27 having a bevelled outer end 28. The outer end of the lug 21 may be similarly bevelled and it may have a nose or extension 29 capable of lying flat against the side faces of the detent 27.

Each slide 18 may be yieldingly urged into or retained in the position shown in Figure 1 by a spring 30 in the respective bore 19 and the slides may be moved in unison against the influence of the springs by means of a control ring 31 which encircles the driving member 2 and has pins 32 passing through slots 33 in the outer part of the driving member, the pins engaging the slide 18. The width of the control ring may be such that it completely covers the slots 33 at all positions of the ring.

In operation, assuming the slides 18 to be in the position shown in Figures 1 and 3 and the driving member 2 to be rotating in the direction indicated by the arrows A in Figures 2 and 3, then the gripping elements 4 will take up the position clearly illustrated in Figure 2, which will result in the driven member 3 rotating in the same direction as the driving member. The cage 6 is urged in the reverse direction to the arrows A by the springs 30 forcing the bevelled ends of the lugs 21 against the complementary bevelled ends of the detents 27. It will be seen therefore that in this condition the device provides a coupling between the members 2 and 3 with ability for the driven member 3 to overrun, and for coupling to be again established when the speed of the driving member 2 synchronizes with that of the driven member. It should also be noted that the extensions 29 of the lugs 21 counteract any tendency of the detents 27 to override due to any thrust imparted by the gripping elements when "free wheeling", the noses 29 and the side faces of the detents providing a positive stop.

On moving the control ring 31 to the right from the position shown in Figure 1 until the strikers 17 engage the ribs 16 on the presser members 13 while the driven member is overrunning the driving member 2, the pressers will be depressed against the gripping elements 4 which are thus caused to roll about their own axes in the direction of the arrows, Figure 7, until they arrive at and engage the opposite end portions of the cam surfaces 7 as indicated in Figure 7, so that on release of the control ring it will return to the left and the bevelled end of each lug 21 will be disposed at the opposite side of the bevelled end of the detent 27, as indicated in Figure 4, thereby causing the cage to be urged under influence of the springs 30, lugs 21 and detents 27 in the direction of the arrow A, Figure 2. In this condition the member 2 can be considered as a braking member to the member 3 and can also be used as a driving member in the direction of the arrow B, Figure 2. Assuming now that the control ring 31 be moved to the right for the full extent of its movement while the driven member 3 is overrunning or while driving is not being effected, then the strikers 17 will have passed over the ribs 16 depressing the pressers 13 and thus allowing the gripping elements to be freed from the positions shown in Figure 2, and each lug 21 will be directed by the inclined edges 26 of its slot 22 into the central relatively narrow portions 24, as indicated in Figure 5, with the result that a condition of uncoupling exists between the driving and driven members, the gripping elements 4 being disposed about midway of the length of the cam surfaces 7 as in Figure 8.

Figure 10:
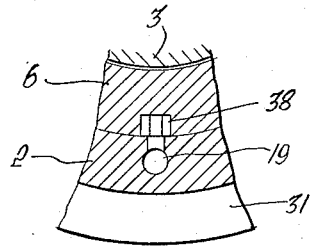
Figure 10 is a section taken on the line X—X of Figure 9.
Figure 11:
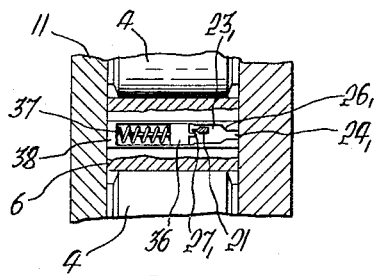
Figure 11 is a sectional plan taken on the line XI—XI of Figure 9.

Referring now to Figures 9, 10 and 11 which illustrate a modified construction of spring influenced means to yieldingly hold the cage 6 at opposite sides of its neutral position, the detent 27' consists of a forward projection of a plunger 36 which is urged towards the lug 21 by a spring 37. The plunger, and the spring may be disposed within a metal block or carrier 38 having a slot with portions 23' and 24' and faces 26' the equivalent of those illustrated in Figures 1 and 3 to 6.

Figure 12:
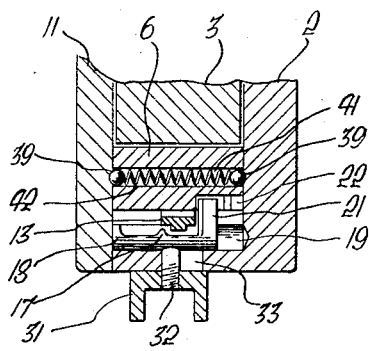
Figure 12 is a fragmentary section of another modified form of controlling means.

Figure 12 illustrates another modification of the spring influenced cage positioning means in which ball detents 39 urged outwardly from axial holes 41 in the cage 6 by springs 42 engage recesses or dimples in the inner surfaces of the driving member 2 and the cover plate 11. The slides 18, strikers 17, slots 22 in the cage, and the other associated parts are similar to those illustrated in Figures 1 to 6.

Figure 13:
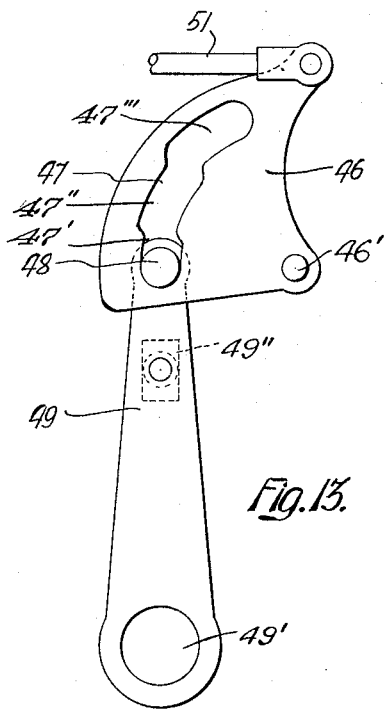
Figure 13 is an elevation of a convenient form of operating means for a clutch embodying the present improvements for application to an automobile.

A convenient means for operating the device when applied to an automobile is indicated in Figure 13 and comprises a cam 46 pivoted at 46' to any convenient support and coupled to the usual engine clutch pedal (not shown) by means of the rod 51. The cam has a slot having curved portions 47', 47" and 47"' concentric with the pivot 46' but of different radii and receiving a pin 48 carried by a forked lever 49 pivoted at 49' and having a slipper block 49" on each of its arms adapted to engage the control ring 31. Depression of the engine clutch pedal causes the cam 46 to swing on its pivot 46' and the pin 48 to traverse the cam slot, the pin 48 being in the portion 47' when the engine clutch is fully engaged, in the portion 47"' when the engine clutch is fully released and in the portion 47" when the engine clutch is in an intermediate position. During the time that the pin 48 is in the portion 47", the strikers 17 are held in engagement with the pressers 13.

The device being fitted between the change speed mechanism and the driving wheels of an automobile it is clear that at all times when the engine clutch pedal is fully depressed the change speed mechanism is uncoupled at both ends, that is to say, by the usual clutch at the forward end and by the lugs 21 engaging the narrow portions 24 of the slots 22 as in Figure 5, the pin 48 being in the cam slot portion 47"' at this stage, so that the gear changing operations are simplified. Should the automobile be stationary and it is desired to move off either in a forward or reverse direction the clutch pedal can be fully depressed and the desired gear engaged. As the clutch pedal is released and before final engagement (that is, when the pin 48 is in the cam slot portion 47"') the movement of the driving member 2 carrying the pressers 13 which are still depressed, causes the gripping elements 4 to roll to the correct end portions of the cam surfaces 7. It should be here noted that there is a slight lost motion and overlap in the operation of the slotted cam 46 to ensure that:—

(a) The pressers 13 are held depressed until the driving member 2 has made initial movement during the time the pin 48 is in cam slot portion 47"'.

(b) Continued movement brings the lugs 21 and their detents 27 into engagement so that the cage holds the gripping elements ready to re-engage after overrunning. Should the automobile be overrunning i. e. "free wheeling" and it is desired to use the engine as a brake an initial depression and release of the clutch pedal will cause the rollers and cage to be positioned as indicated in Figures 4 and 7. To again take up driving, a similar operation will be necessary. In order to prevent shock in taking up the drive, the rod 51 will preferably be so adjusted that the usual clutch is partially engaged before the pressers 13 engage the gripping elements 4 to position them for braking.

According to the embodiment illustrated in Figures 14 to 31 the presser members 13 are not depressed during the movement of the control ring 31 from a clutching position to the neutral position but are depressed during the return movement of the ring to thereby cause the gripping elements 4 to roll to the appropriate end portions of their cam surfaces 7. In this embodiment the slides movable with the control ring to actuate the pressers 13 are in the form of blocks 56 (see particularly Figures 18 and 19) accommodated by longitudinal slots 57 in the inner periphery of the control ring. Each block may have at one end a substantially cylindrical portion 58 with a flat face or square corner portion 59 extending transversely and adapted to contact with the outer face 61 of its slot 57. Disposed within the bore of the cylindrical portion is a spring 62 adapted to press friction discs 6 outwardly from each end of the bore against the side walls of the slot 57, so that each block will move with the control ring except when the movement of the block is opposed as hereinafter referred to. Intermediately of its length each block has a slot 65 to accommodate the reduced head 66 of the pin 67 slidable radially within a radial hole 68 leading from a circumferential groove 12 in the inner periphery of the driving member 2. The inner end of the pin engages a stud 71 projecting outwardly from the rear or convex surface of a presser member 13 into the radial hole 68. The outward movement of the pin 67 in hole 68 may be limited by a snap ring 72. The end of the slot 65 in each sliding block remote from the cylindrical portion 58 is undercut or in other words reduced in height by a transverse shoulder portion 73 of less height than the cylindrical portion. The under face 74 of the shoulder portion is adapted to engage the top of the pin head 66, and the outer face 76 of the shoulder portion is bevelled. The operation of the sliding blocks and associated parts will be described later.

In this embodiment instead of providing slots 22 in the outer periphery of the cage 6 as in Figures 1 to 8 similar slots 22″, 23″, 24″, 26″ are formed in the inner periphery of the control ring, whilst each co-operating detent 27″ consists of a strip of metal projecting into the slot and held in position by an integral dovetail portion 77 which fits into a dovetail groove 78 in a side flange of the control ring. The lug 21″ co-acting with the slot 22″ and detent 27″ instead of being movable with the control ring as in Figures 1 to 12 is attached to the cage 6 and as clearly seen in Figures 15 and 16 may consist of a flattened head of a pin 79 which passes freely through a circumferentially elongated passage 81 in the driving member 2 and into a radial hole 82 in the cage to which it may be retained by a screw 83. In order to urge the cage in opposite directions according to different positions of the mechanism, the driving member 2 may have a number of bores 84 (Figures 16 and 21) with reduced inner ends through each of which a ball 86 is pressed by a spring 87. The balls are adapted to engage the pins 79 at one side of their longitudinal centres when the pins are in their extreme positions, that is when they are not aligned with the central narrow part 24″ of their slots 22″. It will thus be evident that the spring pressed balls 86 by acting on the pins 79 tend to urge the cage 6 in the direction which will depend on the position of the pins 79 in the circumferentially elongated passages 81 of the driving member.

When the parts are in the positions indicated in Figures 14, 15, 16, 17, 22, 26, and 29 the device provides a coupling between the driving and driven members which allows the driven member to overrun. It will be noted from Figures 14 and 22 that the sliding block 56 is slightly tilted or inclined about its cylindrical end portion 58 and that the pin 67 is resting upon the stud 71 of the presser 13. The pins are of insufficient weight to depress the pressers 13 and when the driving member is rotating at high speed they may be projected outwardly of the holes 68 by centrifugal force, the snap rings 72 limiting the outward movements of the pins as beforementioned.

On moving the control ring 31 to the right from the position shown in Figures 14 and 22 it will carry each sliding block 56 with it until one end of the slot 65 in the sliding block contacts with the pin head 66 as seen in Figure 23, thereupon the motion of the sliding block will be arrested. It will also be seen that the shoulder 73 of the block is clear of the pin head 66 so that during further movement of the control ring to the right a striker 17′ carried by the control ring will ride over the shoulder 73 depressing same without, however, actuating the pin 67 or the presser 13 associated therewith, until the ring arrives at the end of its outward movement as indicated in Figure 24. In this position of the ring, the cage positioning pins 79 and lugs 21″ will be in neutral positions as indicated in Figures 28 and 31.

On return movement of the control ring from the position shown in Figure 24 the sliding block 56 is carried therewith until its shoulder 73 is brought above the head 66 of the pin 67 as in Figure 25 and the shoulder portion of the block is raised or tilted. It will be clear that by continuing the return movement of the control ring, the striker 17′ will engage and ride over the shoulder 73 depressing same and thus moving the pin 67 inwards so that the pressers 13 will be engaged with the gripping elements 4 ready to cause them to roll to the driving position as governed by the differential speeds of the driving and driven members 2 and 3. If the driven member happened to be overrunning the driving member the gripping elements 4 would be rolled into positions indicated in Figure 15. To ensure that the control ring has purely longitudinal movements it may be provided with one or more longitudinal slots 70 (Figure 15) to accommodate guide pins or studs 75 secured to and outstanding from the driving member 2.

The tip of each detent 27″ may be bevelled as seen in Figures 17, 29, 30 and 31 in order to deflect lug 21″ into position for normal driving when the driving and driven members have no relative motion.

The action of the device illustrated in Figures 14 to 31 is similar to that illustrated in the previous figures with the exception that the pressers 13 are depressed only when the control ring is moving from a declutching position into a clutching position.

Any suitable means may of course be provided for operating the control ring 31 and we have shown, by way of example, a suitable operating means in Figure 32 wherein the usual clutch pedal 88 of an automobile is connected by a rod 89 and a dead eye 90 with an intermediately pivoted forked lever 91 carrying slippers 92 for engaging the control ring 31 between its side flanges. The rear end portion 89a of the rod may be screw threaded and encircled by nuts 93 and washers 94 co-operating with the dead eye 90 whereby the effective length of the rod may be adjusted.

A spring 95 may encircle the rod 89 between the dead eye and adjusting nuts 96 on the rod near its rear extremity. When the parts of the device have been positioned for the engine to act as a brake and the main clutch is thrown out, the device will continue to actuate the gears and the like of the change speed mechanism and the gripping elements 4 will be under a slight load. In such conditions depression of the clutch pedal may place a strain on the cage positioning pins 79 if the load on the gripping elements is sufficient to resist the neutralizing action. To avoid damage to the pins 79 the spring 95 is placed under sufficient compression to ensure normal operation under ordinary conditions but to yield in order to relieve the pins 79 of strain when the device is in the condition previously mentioned.

If it is desired, provision may be made whereby the driving and driven members may be directly connected or locked together at the will of the driver or operator so that in the event of any breakage or defect in the mechanism or for any other cause or reason, a direct drive may be obtained. For this purpose the hug portion or shaft 98 of the driven member may have a dog clutch member 99 slidable axially thereon by means of suitable operating gear into engagement with a clutch face 101 on the cover plate 11 as indicated in Figure 32.

In all cases it should be understood that the device can be disposed within a casing 97 (Figure 32) charged with oil or grease, and that the driving and driven members 2 and 3 may be adapted in any suitable manner for connection to shafts or other parts. It should also be understood that devices embodying the invention are not limited in their application to automobiles but may be applied with advantage to machines of many different kinds.

Having now described our invention what we claim as new and desire to secure by Letters Patent is:—

1. In a clutch or like device a driving member, a driven member, said members having concentrically spaced circular surfaces, one surface being plain and the other provided with cam faces which are spaced apart and elongated circumferentially, rollers disposed between the cam faces and the plain circular face, and control means including a presser member operable to press the rollers against the plain face and having a surface which cooperates with the plain face to thereby form between them a path along which the rollers are rolled by friction with said face into different positions circumferentially of said cam faces according to differential speed of rotation of the driving and driven members.

2. In a clutch or like device, a driving member, a driven member, said members having concentrically spaced circular surfaces, one of said surfaces being plain and the other provided with circumferentially spaced cam faces, a cage disposed between said concentric spaced surfaces and capable of relative circumferential movement, rollers carried by said cage and adapted to contact with said cam faces and said plain surface, means engageable with said rollers to cause them to roll into different positions between said driving and driven members, and resilient means urging the cage under certain conditions in a direction tending to maintain the rollers in drive transmitting contact with the cam faces and plain circular face.

3. In a clutch or like device driving and driven members having concentrically spaced circular surfaces one of which is plain and the other provided with circumferentially spaced cam faces, a cage disposed between said circular surfaces and capable of relative circumferential movement, gripping elements such as rollers revolvable in said cage and capable of contacting with said cam surfaces and the opposing plain circular face, means adapted to press said gripping elements against said plain complementary face so that they may be caused to roll circumferentially of said cam surfaces due to differential speed of rotation of the driving and driven members, and resilient means urging said cage under certain conditions in a direction tending to maintain the gripping elements in drive transmitting positions irrespective of which member is, for the time being, acting as the driving member.

4. A clutch in accordance with claim 3 and further characterized in that said cage with said gripping elements is movable into three different positions relative to said cam faces, in one position the gripping elements enabling the driven member to over-run the driving member, in another position causing the driving member to act as a brake preventing excessive speed of rotation of the driven member, and in the third position allowing independent rotation of the members, the means acting on the cage tending to move it in a counter direction to the driving member when the gripping elements are in the first mentioned position, tending to move the cage in the same direction as the driving member when the gripping elements are in the second position and holding the cage fixed to the driving member when the gripping elements are in the third position.

5. A clutch in accordance with claim 2 and further characterized by a single control member adapted to actuate said roller engaging means and also to set said means acting on said cage in positions corresponding to those of the rollers.

6. In a clutch or like device a driving member, a driven member, said members having concentrically spaced circular surfaces, one surface being plain and the other provided with cam faces which are spaced apart and elongated circumferentially, rollers disposed between the cam faces and the plain circular face, one or more presser elements movably carried by the member having the cam faces, and operating means whereby the presser elements may press the rollers against the plain circular face to cause the rollers to vary their positions with regard to the cam faces according to differential speed of rotation of said driving and driven members said presser element operating means comprising a control member slidable on one of said members and provided with strikers adapted to engage said presser elements.

7. In a clutch or like device, a driving member, a driven member, said members having concentrically spaced circular surfaces one of which is plain and the other provided with circumferentially spaced cam faces, a cage disposed between said circular surfaces and capable of relative circumferential movement, rollers carried by the cage adapted to contact with said cam faces and said plain surface, a control member having strikers adapted to cause said rollers to be pressed against said plain surface during movement of said control member in one direction only resilient means urging the cage under certain conditions in a direction tending to maintain said rollers in drive transmitting contact with said cam faces and said plain circular face, and means operable by, and during movement in each direction of, said control member, for setting said means acting on the cage in positions corresponding to those of said rollers.

8. A clutch in accordance with claim 7 and further characterized by said control member being in the form of a ring slidable axially around the clutch, and provided with longitudinal grooves in its inner periphery, slotted blocks located one in each of said grooves capable of moving with said ring and also tilting within said grooves, presser members for engaging the rollers, operating pins for said presser members projecting into the slots of said blocks, and a shoulder projecting over the slot of each block to engage the respective pin.

9. A clutch or like device comprising driving and driven members providing outer and inner surfaces between which frictional tripping elements are disposed, and independent control elements providing a further surface cooperating with a surface of one of said members and thereby forming a path along which the frictional gripping elements are caused to travel in taking up a driving position due to differential speed of said driving and driven members.

10. A clutch or like device according to claim 1 and in which the presser member is movably carried by the member having the cam face.

In testimony whereof we affix our signatures.

GEORGE FREDERICK THOMAS.
THOMAS DUNCAN LEAPER.